G. A. BURNHAM.
ELECTRIC SWITCH.
APPLICATION FILED APR. 25, 1910.

980,863.

Patented Jan. 3, 1911.

2 SHEETS—SHEET 1.

Witnesses:
H. B. Davis,
D. S. Peterson.

Inventor:
George A. Burnham
by Hayes & Harriman
Attys.

G. A. BURNHAM.
ELECTRIC SWITCH.
APPLICATION FILED APR. 25, 1910.

980,863.

Patented Jan. 3, 1911.

2 SHEETS—SHEET 2.

Witnesses:
H. B. Davis,
D. I. Peterson.

Inventor:
George A. Burnham
by Noyes & Harriman
Attys

UNITED STATES PATENT OFFICE.

GEORGE A. BURNHAM, OF SAUGUS, MASSACHUSETTS, ASSIGNOR TO S. B. CONDIT, JR., OF BOSTON, MASSACHUSETTS.

ELECTRIC SWITCH.

980,863.

Specification of Letters Patent.   Patented Jan. 3, 1911.

Application filed April 25, 1910.   Serial No. 557,351.

*To all whom it may concern:*

Be it known that I, GEORGE A. BURNHAM, of Saugus, in the county of Essex and State of Massachusetts, have invented an Improvement in Electric Switches, of which the following is a specification.

This invention relates to electric-switches, and particularly to those wherein the switch-members are submerged in oil, and has for its object the provision of an insulating-plate for supporting the switch-members in an oil-well, and means for attaching said members to the plate which extend through the plate, whereby electrical connection with said members may be made above the plate, and also the provision of quick-acting operating means for the movable switch-member or members, whereby the inherent spring-action of said members may be utilized to produce the quick action required for the operating-means.

Figure 1:
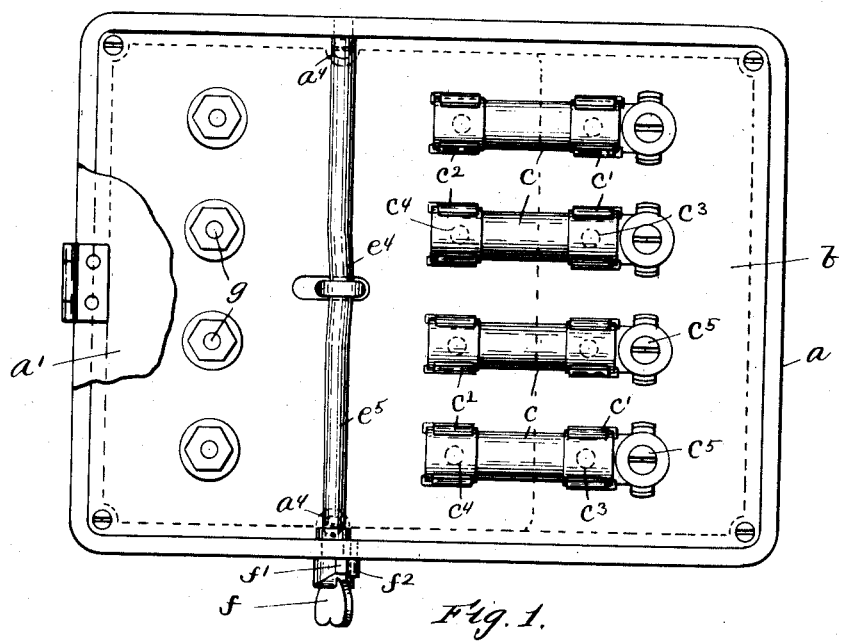
Figure 2:
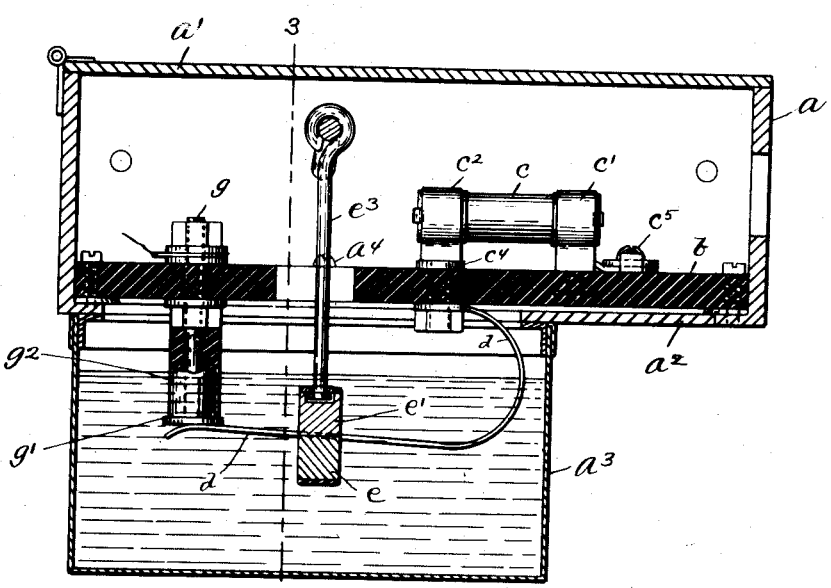
Figure 3:
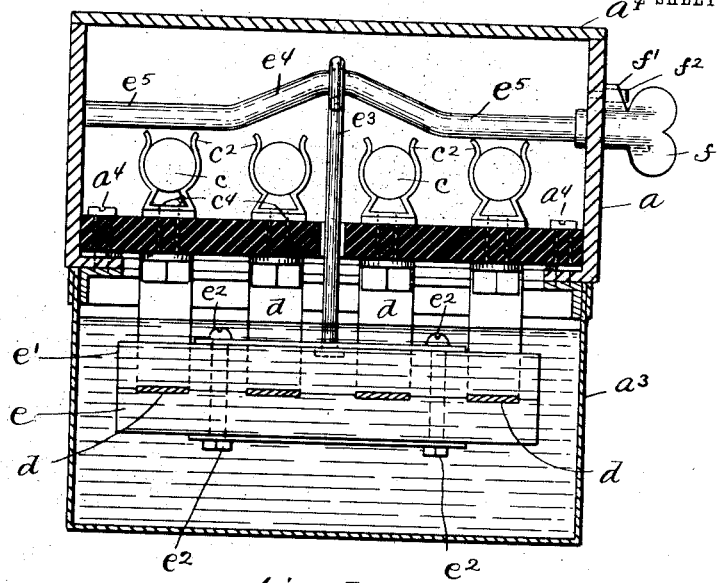
Figure 4:
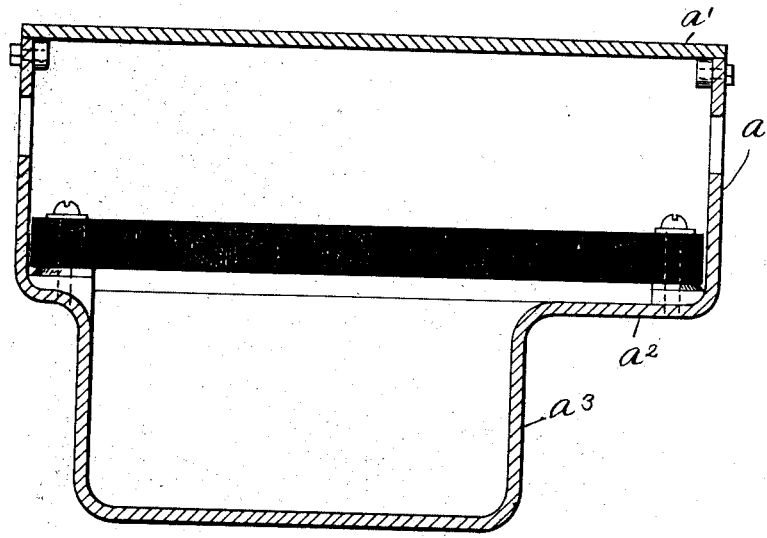

Figure 1 is a plan view of an electric-switch embodying this invention, the cover of the case being removed; Fig. 2 is a longitudinal vertical section of the electric-switch shown in Fig. 1; Fig. 3 is a transverse section of the electric-switch shown in Fig. 1, taken on the dotted line 3—3, Fig. 2; Fig. 4 is a longitudinal vertical section of a modified form of case.

For inclosing and supporting the operating parts of the switch I employ a case $a$, a base-plate $b$ of insulating material, and an oil-well $a^3$, all attached together, the base-plate extending over the top of and covering the oil-well, and the case extending from the top of and covering the base-plate.

In Figs. 1, 2 and 3 the case shown comprises essentially a box-like structure $a$, having a cover $a'$ at the top for closing it, and having a portion of its bottom made solid, as at $a^2$, and the remaining portion made open, and a detachably-connected oil-well or chamber $a^3$ is arranged beneath the open bottom of said case. The oil-well $a^3$ is detachably secured by screws $a^4$, which extend through the bottom of the case, and are accessible when the cover $a'$ is opened. The advantage of having the oil-well detachable is that it may be filled with oil to a known level while detached from the case, and then attached thereto. Said case and oil-well may, however, be made in a single integral piece, as shown in Fig. 4. This construction is cheaper to manufacture, but the exact amount of oil contained in the oil-well is not known. Either form may be used as desired. A base-plate $b$, of slate or other insulating material, is attached to the case, and, as here shown is placed in the case. It is made large enough to fit within the side-walls of the case and entirely cover the bottom thereof. It rests on the bottom $a^2$, and on lugs arranged around the side of the opening in the bottom. It is attached at the corners by screws, as shown, but so far as my invention is concerned the manner of attaching the base-plate to the case, and the construction of the base-plate are immaterial. The plate $b$ is made large enough to support the switch-members on its under side, and one or more electric-fuses on its upper side, but if the fuses are omitted, as may be the case, then the plate $b$ will be made considerably smaller and the case $a$ made correspondingly smaller.

$c$ represents the fuses, of which four are herein shown, although any number may be employed. They may be of any well known or suitable construction.

$c'$, $c^2$, represent the usual clips for the conducting-terminals, which are provided at the ends of the fuses. Said clips are secured to the plate $b$ in any well known or suitable manner, as, for instance, by screws $c^3$, $c^4$, extending into or through the plate. The clips $c'$ have connected with them binding-screws $c^5$, for the circuit-wires. The screws $c^4$ purposely extend through the plate so as to serve as a means of attachment for the movable switch-members, thereby insuring positive electrical connections and also compactness of parts.

Each movable switch-member, of which one or more may be provided, according to the number of switches employed, consists, as here shown, of a C-spring $d$, composed of a flat strip of brass or other conducting material, bent to form the spring. One end of said spring is attached to the under side of the plate $b$, as by the screw $c^4$, and the other end thereof is free and is adapted to be moved into engagement with a fixed switch-member against its own spring-action, and to move out of engagement therewith quickly when released or permitted to act. For the purpose of moving said switch-member $d$, its free end-portion is engaged by a suitable clamp, as, for instance, it may be disposed between a pair of blocks $e$, $e'$, of wood or other suitable insulating material, and said blocks are rigidly secured together by bolts $e^2$, thereby clamping the spring between them. The clamp may be made long enough to engage all the springs. The upper block is connected loosely with the lower end of a rod $e^3$, which extends up through a hole in the plate $b$, and the upper end of said rod is connected loosely with the crank portion $e^4$ of a shaft $e^5$, which is extended transversely from side to side of the case $a$, and which has end bearings in the side-walls thereof. A finger-piece $f$ is secured to one end of the crank-shaft $e^5$ by which it may be turned, and said finger-piece has arranged on it a lug $f'$, which is adapted to engage a pin $f^2$ projecting from the case when the crank-shaft is in normal position and the switch closed, as shown in the drawing. The crank-portion of the shaft is normally disposed at one side of the center, see Fig. 2, in which position it is held by the spring-acting switch-member or members bearing against the fixed switch-member or members, and, when in this position, the lug $f'$ engages the pin $f^2$ to lock the switch in closed position. By turning the finger-piece to the left, the crank-portion of the shaft causes the movable switch-members to yield while passing the center, but, as soon as it has passed the center, the inherent spring-action of the switch-members is sufficient to cause them to quickly move away from the fixed switch-members, and to pull down the rod $e^3$ and move the crank-portion of the shaft into its lowermost position. As such movement of the switch-member or members is quick, and is produced by the inherent spring-action of said member or members, it is practically out of the control of the operator, notwithstanding the finger-piece is still held by him. Thus a quick break of the switch-members is produced. By turning the finger-piece in a direction toward the right, the switch-member or members are positively drawn up against their own spring-action by the rod, until the crank-portion of the shaft passes the center, when the spring-action of said member or members acts to move the shaft and finger-piece connected with it farther to cause the lug $f'$ to engage the pin. This particular construction of means for moving the spring-acting switch-member or members forms one of the novel features of my invention, but so far as other features of the invention are concerned, any other means may be employed for moving said switch-member or members, which will be controlled by a spring so that a quick break will be produced.

As a fixed switch-member a post, $g$, is here shown, which is attached to the under side of the plate and extends down into the oil-well. It is here shown as a screw, and extends through the plate $b$, and is secured to said plate by nuts arranged thereon above and below the plate. At the lower end of said post, a flat disk $g'$ is secured, having an engaging face formed for engagement with the free end of the movable switch-member. The post may be inclosed by an insulating bushing, $g^2$, to protect it, although its lower end will be exposed for the engagement therewith of the movable switch-member. As many posts will be employed as there are movable switch-members. The nut which is arranged on the post above the plate $b$, provides for the electrical connection therewith of a circuit-wire. Such a post, or any equivalent form thereof, provides an engaging-portion for the movable switch-member below the plate and in the oil-well, and also provides for the electrical connection therewith of a circuit-wire above the plate, so that, by lifting the cover of the case, all of the electrical connections will be exposed.

The electric-switch here shown is very substantial and durable, and its construction is simple, so that it is not liable to get out of order; it can be used in places where switches are usually roughly handled, as the parts are completely protected; it can be used to advantage in mills, where lint is flying in the air, with safety, for the reason that the case is dust-proof. It is particularly well adapted for use in connection with small motors, where an individual drive is required.

I claim:

1. In an electric-switch, a supporting-plate, one or more spring-acting switch-members attached at one end to said plate, one or more fixed switch-members attached to said plate adapted to be engaged by the free ends of said spring-acting switch-members, a rod connected with the free end portion of said spring-acting switch-members, a crank-shaft to which said rod is connected, means connected with said shaft for turning its crank portion by the center and moving the spring-acting switch-members against their own spring action into engagement with the fixed switch-members, means for arresting said crank-shaft after passing the center, in engagement with which said shaft is held by the spring-acting switch-members, said switch-members moving quickly away from the fixed switch-members as soon as the shaft passes the center on its return movement, substantially as described.

2. In an electric-switch, a case, a base-plate and an oil-well, attached together, the case covering the base-plate and the base-plate covering the oil well, one or more spring-acting switch-members attached to the under side of said plate by connections extending through the plate, one or more fixed switch-members attached to the under side of said plate by connections extending through the plate, and means connected with the movable switch-members for moving them against their own spring action, into engagement with the fixed switch-members and for locking them which permits them to move quickly away from the fixed switch-members when released, substantially as described.

3. In an electric-switch, a case, a base-plate and an oil-well, attached together, the case covering the base-plate and the base-plate covering the oil-well, one or more spring-acting switch-members attached to the under side of said plate by connections extending through the plate, one or more fixed switch-members attached to the under side of said plate by connections extending through the plate, a rod connected with the movable switch-members, a crank-shaft to which said rod is connected, means connected with said shaft for turning it in one direction to move its crank-portion by the center, and move the switch-members against their own spring action into engagement with the fixed switch-members and for turning said shaft in the opposite direction to move its crank-portion by the center, permitting said switch-members to move quickly away from the fixed switch-members, substantially as described.

4. In an electric-switch, a case, a base-plate and an oil-well, attached together, the case covering the base-plate and the base-plate covering the oil-well, a plurality of spring-acting switch-arms attached to the under side of said plate, a plurality of fixed switch-members attached to the under side of said plate and extending down into the oil-well, a clamp engaging all of said movable switch-members, a crank-shaft, a rod connecting said clamp with said crank-shaft, and means connected with said crank-shaft for turning its crank-portion by the center and moving the switch-members against their own spring action into engagement with the fixed switch-members, and for turning its crank-portion in the opposite direction by the center, permitting the switch-members to move quickly away from the fixed switch-members, substantially as described.

5. In an electric-switch, a flat C-spring attached at one end to a base, its opposite end being free, a fixed switch-member arranged to be engaged by the free end of said spring, a crank-shaft, a link connection between the crank-portion of said shaft and the intermediate portion of said spring, whereby said spring may be operated by said shaft, means for turning said shaft in one direction to move its crank-portion by the center to move said spring against its own spring action into engagement with the fixed switch-member and for turning said shaft in the opposite direction to move its crank-portion by the center to release said spring and permit it to move quickly away from said fixed switch-member, substantially as described.

6. In an electric-switch, a case, a base-plate and an oil-well, attached together, the case covering the base-plate and the base-plate covering the oil-well, a plurality of flat C-springs attached at one end to the under side of said plate by means extending through the plate, the opposite ends of said springs being free, a plurality of fixed switch-members attached to the under side of said plate by means extending through the plate and arranged to be engaged by the free ends of said springs, a crank-shaft, and means connecting all of said springs with said crank-shaft, and means connected with said shaft for turning it to pass its crank-portion by the center and move all of the springs against their own spring-action into engagement with the fixed switch-members and for turning said shaft in the opposite direction to pass its crank-portion by the center, permitting said springs to move quickly away from the fixed switch-members, substantially as described.

7. In an electric-switch, a supporting-plate, one or more spring-acting switch-members attached at one end to said plate, one or more fixed switch-members attached to said plate adapted to be engaged by the free ends of said spring-acting switch-members, means for moving said spring-acting switch-members against their own spring action into engagement with said fixed switch-members, arresting means for said operating means in engagement with which said operating means is held by the spring-acting switch-members when in engagement with the fixed switch-members, said spring-acting switch-members moving quickly away from the fixed switch-members upon the return movement of the operating means, substantially as described.

In testimony whereof, I have signed my name to this specification, in the presence of two subscribing witnesses.

GEORGE A. BURNHAM.

Witnesses:
B. J. NOYES,
H. B. DAVIS.